United States Patent [19]

Lindgren et al.

[11] Patent Number: 5,625,243
[45] Date of Patent: Apr. 29, 1997

[54] ROTOR CONSTRUCTION IN AN ASYNCHRONOUS ELECTRIC MACHINE

[75] Inventors: Olli Lindgren, Helsinki; Antero Arkkio, Espoo, both of Finland

[73] Assignee: High Speed Tech Oy Ltd., Tampere, Finland

[21] Appl. No.: 260,738

[22] Filed: Jun. 15, 1994

[30] Foreign Application Priority Data

Jun. 15, 1993 [FI] Finland ................................. 932732

[51] Int. Cl.⁶ .......................... H02K 17/16; H02K 1/22
[52] U.S. Cl. .................................. 310/211; 310/261
[58] Field of Search ........................ 310/44, 45, 211, 310/261

[56] References Cited

U.S. PATENT DOCUMENTS

| | | | |
|---|---|---|---|
| 2,387,073 | 10/1945 | Horlacher | 310/211 |
| 2,996,791 | 8/1961 | Hicks | 310/211 |
| 3,191,270 | 6/1965 | Martin et al. | 310/44 |
| 3,848,331 | 11/1974 | Pavlik et al. | 310/44 |
| 3,974,408 | 8/1976 | Fehr et al. | 310/165 |
| 4,255,494 | 3/1981 | Reen et al. | 310/44 |
| 4,501,984 | 2/1985 | Mishima | 310/44 |
| 4,758,758 | 7/1988 | Laing | 310/261 |
| 5,473,211 | 12/1995 | Arkkio | 310/261 |

FOREIGN PATENT DOCUMENTS

| | | | |
|---|---|---|---|
| 1017121 | 12/1952 | France | 310/44 |
| 55-136856 | 10/1980 | Japan | 310/211 |
| 63-121438 | 5/1988 | Japan | 310/261 |
| 311338 | 9/1971 | U.S.S.R. | 310/44 |
| 936224 | 6/1982 | U.S.S.R. | 310/261 |
| 1023534 | 6/1983 | U.S.S.R. | 310/261 |
| 1334273 | 8/1987 | U.S.S.R. | 310/261 |
| 824863 | 12/1959 | United Kingdom. | |
| 1427818 | 3/1976 | United Kingdom | 310/211 |
| 2035715 | 6/1980 | United Kingdom. | |

*Primary Examiner*—Clayton E. LaBalle
*Attorney, Agent, or Firm*—Pollock, Vande Sande & Priddy

[57] ABSTRACT

A rotor in an asynchronous electrical machine used in high speed applications, comprises an electrically conductive conductor surrounding a rotor shaft and located substantially adjacent to a stator of the asynchronous electrical machine, a coating layer made of a ferromagnetic particulate material having an electric conductivity substantially lower than that of the conductor, the coating layer being placed between the rotor shaft and the conductor and a metallic intermediate layer between the coating layer and rotor shaft, the metallic intermediate layer having yield point lower than that of the coating layer and the rotor shaft.

19 Claims, 1 Drawing Sheet

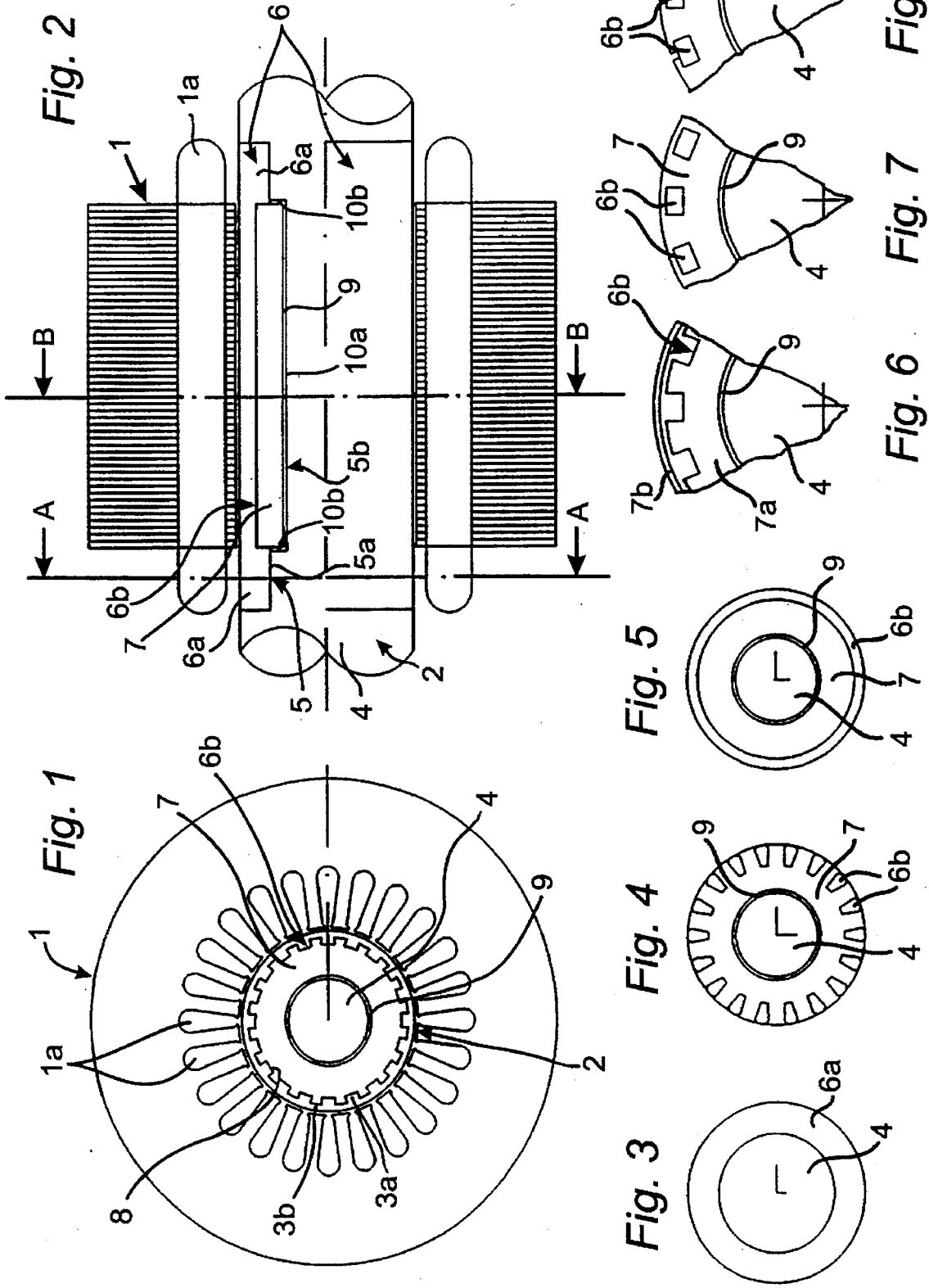

ROTOR CONSTRUCTION IN AN ASYNCHRONOUS ELECTRIC MACHINE

FIELD OF THE INVENTION

The present invention relates to a rotor construction in an asynchronous electrical machine, the rotor comprising an electrically conductive conductor which is located substantially adjacent to a stator of the asynchronous electrical machine and is associated with a rotor shaft.

BACKGROUND OF THE INVENTION

Either so-called solid rotors, or a solution using a so-called rotor core packet coupled to a squirrel-cage winding, are generally used in electrical machines. From a constructional point of view, the solid rotor consists of a set of grooves formed in the rotor shaft and a conductive coating material placed in association therewith. The purpose of the construction has been to improve the electrical properties of the machine, especially its efficiency.

The rotor core packet/squirrel-cage winding represents a better electrotechnical solution than the construction having a solid rotor. However, when the rotational speeds are to be increased, the rotor core packet/squirrel-cage winding solution becomes problematic because of the low yield point of the electric sheets. The great number of sheets in the rotor core packet also lowers the bending-critical rotational speed of the rotor. The rotor core packet/squirrel-cage solution is a problematic solution when the manufacturing technique and also the use, especially the balancing, are taken into account.

In a rotor core packet/squirrel-cage winding solution, the drawbacks are more pronounced at high rotational and peripheral speeds of the rotor, making it necessary to use thin and strong sheets. The highest permitted peripheral speed of the rotor construction is proportional to the square root of the yield point of the sheet material. Consequently, the yield point should lie as high as possible when peripheral speeds are increased. The iron losses are proportional to the first and second power of the rotating speed and the second power of the thickness of the packet sheets.

At high rotational speeds, the increased losses are compensated by making the packet sheets thinner. It must be also considered that the packet sheets are not always of equal thickness due to the tolerances in manufacturing technique. Furthermore, they must be provided with a thin insulating layer on their surfaces for decreasing eddy current losses. The rotor core packet made of thin sheets and the squirrel-cage winding must almost always be compressed in an axial direction for achieving the construction entity. This tends to cause stress states or bending in the rotor construction and may result in unbalanced state of the rotor during the use.

It must also be considered that the yield points of the sheets of the rotor core packet are typically lower than the yield points of the material used in the rotor shaft, and the mechanical stresses of the cylindric packet provided with a central hole become relatively high. As a consequence, the ratio of the length to the diameter of the rotor construction becomes disadvantageous, which tends to lower the bending-critical rotation speed and the highest possible available peripheral speed of the rotor. The power factor of an asynchronous electric machine with a rotor core packet/squirrel-cage winding design is good.

On the other hand, electrical machines equipped with solid rotors attain higher peripheral speeds than the above-described rotor core packet/squirrel-cage winding constructions. This usually results in a higher power/weight ratio. In an electrical machine with a solid-rotor design, the power factor is usually poor under load conditions. The magnetic flux in the rotor construction in this case starts to flow increasingly on the outer surface of the rotor construction, and the eddy currents resulting therefrom cause the magnetic flux to accumulate to an ever increasing extent on the surface of the rotor construction. The result is a strong saturation of the surface layer of the rotor and a strong increase in the magnetomotoric force of the magnetic flux. As stated above, the result is a considerable decrease in the power factor. As a general conclusion, the power factor of an electrical machine with a solid-rotor design is poor, which increases to some extent the losses especially in the stator winding and increases considerably the apparent power required by the power feed device.

SUMMARY OF THE INVENTION

It is an object of the present invention to provide a rotor construction for use in an asynchronous electrical machine which largely helps to eliminate the above-mentioned drawbacks present in the state of the art. Consequently, the first fundamental object is to achieve a rotor construction which is stronger than the rotor core packet/squirrel-cage winding construction. On the other hand, the second fundamental object is to decrease the losses of an asynchronous electrical machine and especially to improve the power factor as compared with that of a corresponding coated electric machine of a solid-rotor design. To attain this goal, the rotor construction according to the invention is mainly characterized in that the surface of the rotor shaft has a coating layer formed of ferromagnetic particulate material of an electrical conductivity substantially lower than that of the conductor construction and that the conductor construction is substantially associated with the coating layer. Hence, in accordance with the present invention, the rotor construction is achieved by placing a ferromagnetic coating layer of a poor electrical conductivity between the rotor shaft and the coating layer. Consequently, the coating layer prevents the formation of eddy currents and at the same time the lowering of the power factor.

The rotor construction consists of three main parts: central rotor shaft, surrounded by a magnetically conductive and low-loss coating layer as well as an electrically conductive conductor construction, which can be a coating and/or a squirrel-cage winding construction, where the current producing the torque of the asynchronous electric machine flows.

The following description illustrates more closely some advantageous embodiments of the rotor construction of the invention. Reference is made to the enclosed drawing, wherein

BRIEF DESCRIPTION OF THE DRAWINGS

FIG. 1 shows an asynchronous electrical machine provided with one embodiment of the rotor construction, as a cross-sectional view taken perpendicularly to the longitudinal axis of the rotor;

FIG. 2 shows a longitudinal section of the asynchronous electrical machine according to FIG. 1 as taken along the longitudinal axis of the rotor; and FIGS. 3 to 8 show embodiments of the rotor construction of the invention as cross-sections of the rotor.

DETAILED DESCRIPTION OF THE DRAWINGS

An alternating current flowing in a stator winding 1a in a stator 1 of an electrical machine according to the drawing produces a magnetic field which rotates in relation to the stator and pierces the rotor construction 2 in a direction transverse to the rotor construction. The magnetic field piercing the rotor construction induces during its rotation a voltage in the conductor 6 of the rotor construction. In the conductor of the rotor construction there is generated an electric current causing a torque in the rotor 2 under joint influence of the rotating magnetic field and the electric current, and the rotor starts to rotate.

In the embodiment of FIGS. 1 and 2, the rotor construction comprises a double recess 5 in the rotor shaft 4. The first part 5a of the double recess extending beyond the stator construction 1 on both sides thereof forms a space for the short-circuiting rings 6a of the conductor 6 at both ends of the stator 1. The second part 5b of the double recess disposed substantially centrally at the stator and being in radial direction deeper than the first part 5a of the double recess, comprises a coating layer 7.

As especially shown in FIG. 1, the coating layer 7 is grooved at its outer surface by means of a set of grooves 8 extending substantially in axial direction. In this way the middle part 6b of the conductor construction disposed at the stator 1 constitutes a combination formed by a so-called squirrel-cage winding construction 3a together with a coating 3b surrounding the latter and the coating layer 7. The conductor construction 6 constitutes in its middle part 6b a sleeve-like construction with a smooth outer surface and with a "toothed" inner surface, the longitudinal direction of the ridges of the teeth lying substantially in the axial direction of the rotor 2.

As an alternative to the embodiment shown in FIG. 2 where the double recess 5 is provided in the rotor shaft 4, the conductor 6 and the coating layer 7 can be formed directly on a smooth surface of the rotor shaft 4, whereby the construction formed by the parts 6 and 7 protrudes from the outer surface of the rotor shaft 4. This alternative embodiment, being associated mainly with the constructional selection of the other parts of the electric machine, is not shown in more detail, because it is obvious to one skilled in the art.

FIG. 3 shows the rotor construction in cross-section at the short-circuiting construction 6a of the conductor construction 6, i.e., in section A—A of FIG. 2.

Further, FIGS. 4 and 5 show at section B—B of FIG. 2 (also FIG. 1 is shown in section B—B) two alternatives for the middle part 6b of the conductor construction. The conductor construction according to FIG. 4 is a squirrel-cage winding embedded in the coating layer 7, and in FIG. 5 the middle part 6b of the conductor construction is a uniform cylindrical smooth-surfaced coating situated outside a smooth-surfaced cylindrical coating layer 7. In other words, FIGS. 4 and 5 show as separate alternatives those conductor construction parts which are in a combination in the rotor construction according to FIG. 1.

In the alternative embodiment according to FIG. 6, the constructional embodiment of FIG. 1 is further developed by surrounding the outer surface of the rotor construction outside the outer surface of the conductor still with a second outer coating layer portion 7b, while the inner coating layer portion 7a is substantially constructed as in FIG. 1. FIG. 7 shows such an alternative where the constructional embodiment shown substantially by FIG. 4 is further developed by embedding the middle part 6b of the conductor layer serving as the squirrel-cage winding construction totally in the coating layer 7. Further, FIG. 8 shows an embodiment where the coating layer 7 comprises at the squirrel-cage winding construction (the conductor construction can in this case be also similar to that of FIG. 6) a set of grooves 8 extending partially in axial and/or radial direction of the rotor construction 2 and consisting of several grooves. The coating layer 7 covers the squirrel-cage winding construction serving as the conductor 6 everywhere else except at the location of the set of grooves 8. The set of grooves 8 can also be of such construction that it does not extend down to the conductor construction 6, that is, the set of grooves 8 lies on the coating layer 7.

The rotor construction according to the present invention for asynchronous electrical machines is intended especially for so-called high-speed applications where the total advantages achieved with the aid of the present invention will be most prominent. However, the field of use of the rotor construction according to the invention is not limited to a range of high peripheral and speeds. Under high-speed application is understood in this connection such peripheral speeds of the coating layer which are typically 100 m/s and preferably 200 to 500 m/s. The rotational speed of the rotor construction lies in this case typically within the range of $2 \times 10^4$ to $3 \times 10^5$ revolutions per minute.

The coating layer 7 is formed on the rotor shaft by exerting a compressing effect or the like on a coating layer blank formed substantially of a ferromagnetic particulate matter to obtain cohesive forces and/or bonds between the particles and/or groups of particles. Suitable methods causing the compressive effect include blast compacting (shockwave compacting) and sintering. The blast compacting technique has been presented in the basic book in the field: D. Reinhard and J. Person, Explosive Working of Metals, 1963, p. 341. The coating layer 7 comprises on the surfaces of at least a part of the particles and/or groups of particles an electric insulation layer which has been formed preferably by oxidizing. The electric insulation layer can be disposed substantially on the surfaces of all particles or by pretreatment of predetermined groups of particles that are subjected to a coating operation. The way of coating depends naturally on the manufacturing technique as a whole and on the other hand on the functional requirements of the coating layer and further, of course, on the size of the particles. The coating is formed before the placing of the particulate matter in a guide structure blank and/or in connection with blast compacting.

It is advantageous to place between the coating layer 7 and rotor shaft 4 an intermediate layer 9 which has preferably a lower yield point than the coating layer and/or rotor shaft 4. Especially with reference to FIG. 2, the intermediate layer 9, which at least partly is preferably of copper, can be placed on the surfaces forming the middle part of the double recess 5 so that the intermediate layer will be disposed in the part 5b on both axial and radial connecting surfaces 10a and 10b, respectively.

The particle size of the ferromagnetic particulate matter and/or the particle size of the group of particles is suitably 5 to 400 µs, typically 25 to 200 µm and most preferably 50 to 150 µm. The thickness of the coating layer 7 in radial direction is approximately one third of the outer radius of the rotor construction 2.

The intermediate layer 9 improves the adhesion between the coating layer 7 and rotor shaft 4 and at the same time balances the stresses generated in the construction.

The ferromagnetic particulate matter can be manufactured at least partly e.g. of ground maraging steel (martensite age hardening steel), of amorphous steel band etc., of nanocrystalline steel banc etc., or at least partly of a combination of these materials. The yield point of the material is most suitably over 400 MPa.

We claim:

1. A rotor in an asynchronous electrical machine used in high speed applications, the rotor comprising an electrically conductive conductor surrounding a rotor shaft and located substantially adjacent to a stator of the asynchronous electrical machine, a coating layer made of a ferromagnetic particulate material having an electric conductivity substantially lower than that of the conductor, said coating layer being placed between the rotor shaft and the conductor, and a metallic intermediate layer between the coating layer and rotor shaft, said metallic intermediate layer having yield point lower than that of the coating layer and the rotor shaft.

2. A rotor according to claim 1, wherein the conductor is placed on the coating layer to substantially uniformly surround the rotor.

3. A rotor according to claim 1, wherein the coating layer is grooved with a set of grooves extending substantially in an axial direction, the conductor being at least partly placed in said set of grooves.

4. A rotor according to claim 1, wherein the coating layer is provided at least within the middle part of the conductor.

5. A rotor according to claim 4, wherein the coating layer comprises a set of grooves extending in an axial and a radial direction on the surface of the rotor.

6. A rotor according to claim 5, wherein said set of grooves extends in the radial direction at least partly down to the conductor.

7. A rotor according to claim 1, wherein the conductor is comprised at least partly of a squirrel-cage winding which is substantially surrounded by the coating layer.

8. A rotor according to claim 1, wherein the coating layer comprises an electrically insulating coating on the surfaces of at least a part of the particles and/or groups of particles of the particulate material.

9. A rotor according to claim 8, wherein the insulating coating is formed by oxidizing.

10. A rotor according to claim 1, wherein the coating layer is formed on the rotor shaft by exerting on a coating layer blank formed substantially of the ferromagnetic particulate material a compressive effect to achieve cohesive forces and/or bonds between the particles and/or groups of particles.

11. A rotor according to claim 10, wherein the particle size of the ferromagnetic particulate material is about 5 to 400 μm, and said ferromagnetic particulate material is selected from at least one of managing steel, amorphic steel and nanocrystalline steel.

12. A rotor according to claim 11, wherein the particle size of the ferromagnetic particulate material is about 25 to 200 μm.

13. A rotor according to claim 11, wherein the particle size of the ferromagnetic particulate material is about 50 to 150 μm.

14. A rotor according to claim 1, wherein the coating layer is formed by blast compacting the ferromagnetic particulate material around the rotor shaft.

15. A rotor construction according to claim 1, wherein the coating layer is formed by sintering the ferromagnetic particulate material around the rotor shaft.

16. A rotor according to claim 1, wherein the coating layer is placed in a recess situated in the rotor shaft, wherein the intermediate layer is placed between the coating layer and the rotor shaft both on axially extending connecting surfaces and radially extending connecting surfaces, wherein the recess is a two-part recess, and wherein the coating layer and the middle part of the conductor are located within the middle part of the recess and the short-circuiting rings at the end portions of the conductor are associated with the end portions of the recess.

17. A rotor according to claim 1, wherein the thickness of the coating layer in a radial direction is approximately one third of the outer radius of the rotor.

18. A rotor according to claim 1, wherein said metallic intermediate layer includes at least partly copper.

19. A rotor in an asynchronous electrical machine, the rotor comprising an electrically conductive conductor surrounding a rotor shaft and located substantially adjacent to a stator of the asynchronous electrical machine, and a coating layer made of a ferromagnetic particulate material having an electric conductivity substantially lower than that of the conductor, said coating layer being placed on the surface of the rotor shaft and the conductor being substantially associated with the coating layer, which rotor further comprises for said high speed applications, where the peripheral speed of the coating layer is over 100 m/s and the rotational speed of the rotor is about $2 \times 10^4$ to $3 \times 10^5$ revolutions per minute, a metallic intermediate layer between the coating layer and rotor shaft, said metallic intermediate layer having yield point lower than that of the coating layer and the rotor shaft.

\* \* \* \* \*